United States Patent
Xu et al.

(10) Patent No.: US 11,966,762 B2
(45) Date of Patent: Apr. 23, 2024

(54) MODAL WINDOW CONTROL METHOD AND APPARATUS, DEVICE, AND STORAGE MEDIUM

(71) Applicant: Beijing Zitiao Network Technology Co., Ltd., Beijing (CN)

(72) Inventors: Yuan Xu, Beijing (CN); Jie Yang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/071,382

(22) Filed: Nov. 29, 2022

(65) Prior Publication Data

US 2023/0195479 A1 Jun. 22, 2023

(30) Foreign Application Priority Data

Dec. 17, 2021 (CN) .......................... 202111554938.4

(51) Int. Cl.
*G06F 3/0481* (2022.01)
*G06F 9/451* (2018.01)

(52) U.S. Cl.
CPC ............ *G06F 9/452* (2018.02); *G06F 3/0481* (2013.01)

(58) Field of Classification Search
None
See application file for complete search history.

(56) References Cited

U.S. PATENT DOCUMENTS

| 2015/0378536 | A1* | 12/2015 | Wang | G06F 3/0481 715/802 |
| 2016/0189328 | A1* | 6/2016 | Vranjes | G06F 3/04886 345/173 |
| 2018/0285328 | A1* | 10/2018 | Pivato | G06F 16/958 |

FOREIGN PATENT DOCUMENTS

| CN | 102436339 A | 5/2012 |
| CN | 107729107 A | 2/2018 |
| CN | 109117216 A | 1/2019 |
| CN | 109783183 A | 5/2019 |

OTHER PUBLICATIONS

International Search Report in PCT/CN2022/136735, dated Feb. 22, 2023, 3 pages.

* cited by examiner

*Primary Examiner* — Tuyetlien T Tran
(74) *Attorney, Agent, or Firm* — Astute IP Law Group

(57) ABSTRACT

Provided are a modal window control method, a device, and a storage medium. The method comprises: acquiring a modal window structure, and adding the modal window structure to a modal stack; in response to updating a state of each window existing at a current interface according to a created loop update event, extracting a system event from a system message queue; in response to a modal window existing at the current interface, determining whether the modal window is the same as a window pointed by a structure located on a top of the modal stack; and in response to the modal window being the same as the window pointed by the structure located on the top of the modal stack, controlling the window located on the top of the modal stack to process the system event.

17 Claims, 3 Drawing Sheets

MODAL WINDOW CONTROL METHOD AND APPARATUS, DEVICE, AND STORAGE MEDIUM

CROSS-REFERENCE TO RELATED APPLICATION(S)

This application claims priority to Chinese Patent Application No. 202111554938.4 filed Dec. 17, 2021, the disclosure of which is incorporated herein by reference in its entirety.

TECHNICAL FIELD

Embodiments of the present disclosure relate to the field of computer technologies, for example, to a modal window control method and apparatus, a device, and a storage medium.

BACKGROUND

In some operating systems, a modal window can only be implemented by calling native application programming interfaces of the operating system, such as NSApplication.runModal(for:), NSWindow.beginSheet(_:completionHandler:), and the like. The preceding method causes the modal window to exclusively occupy all events. In a frame loop interface (for example, a user interface (UI)) framework, the calling of native application programming interfaces may block the event loop, resulting in the problems that framework frame loop update cannot be executed and redrawing, data update and other behaviors cannot be performed on other windows.

SUMMARY

Embodiments of the present disclosure provide a modal window control method and apparatus, a device, and a storage medium to guarantee the execution of frame loop update when a modal window is opened, thereby achieving the object of performing redrawing, data update and other behaviors on other windows in the presence of the modal window.

In a first aspect, an embodiment of the present disclosure provides a modal window control method. The method includes the steps described below.

A modal window structure is acquired, and the modal window structure is added to a modal stack, where the modal stack is used for buffering the modal window structure.

In response to updating a state of at least one window at a current interface according to a created loop update event, a system event is extracted from a system message queue, where the window includes a modal window and/or a modeless window.

If the modal window exists at the current interface, whether the modal window is the same as a window pointed by a structure located on the top of the modal stack is determined.

If the modal window is the same as the window pointed by the structure located on the top of the modal stack, the modal window located on the top of the modal stack is controlled to process the system event.

In a second aspect, an embodiment of the present disclosure further provides a modal window control apparatus. The apparatus includes a modal window structure acquisition module, a window state update module, a determination module, and an event processing module described below.

The modal window structure acquisition module is configured to acquire a modal window structure, and add the modal window structure to a modal stack.

The window state update module is configured to, in response to updating a state of at least one window at a current interface according to a created loop update event, extract a system event from a system message queue, where the window includes a modal window and/or a modeless window.

The determination module is configured to, if the modal window exists at the current interface, determine whether the modal window is the same as a window pointed by a structure located on the top of the modal stack.

The event processing module is configured to, if the modal window is the same as the window pointed by the structure located on the top of the modal stack, control the modal window located on the top of the modal stack to process the system event.

In a third aspect, an embodiment of the present disclosure further provides an electronic device. The electronic device includes one or more processing apparatuses and a storage apparatus which is configured to store one or more programs.

The one or more programs, when executed by the one or more processing apparatuses, enable the one or more processing apparatuses to perform the modal window control method described in embodiments of the present disclosure.

In a fourth aspect, an embodiment of the present disclosure further provides a computer-readable medium storing a computer program, where the program, when executed by a processing apparatus, performs the modal window control method described in embodiments of the present disclosure.

The embodiments of the present disclosure provide a modal window control method and apparatus, a device, and a storage medium. In the modal window control method, a modal window structure is acquired, and the modal window structure is added to a modal stack; in response to updating a state of a window at a current interface according to a created loop update event, a system event is extracted from a system message queue, where the window includes a modal window and/or a modeless window; if a modal window exists at the current interface, whether the modal window is the same as a window pointed by a structure located on the top of the modal stack is determined; and if the modal window is the same as the window pointed by the structure located on the top of the modal stack, the modal window located on the top of the modal stack is controlled to process the system event. The modal window control method provided in the embodiments of the present disclosure can guarantee the execution of frame loop update when a modal window is opened, thereby achieving the object of performing redrawing, data update and other behaviors on other windows in the presence of the modal window.

DETAILED DESCRIPTION

Figure 1:
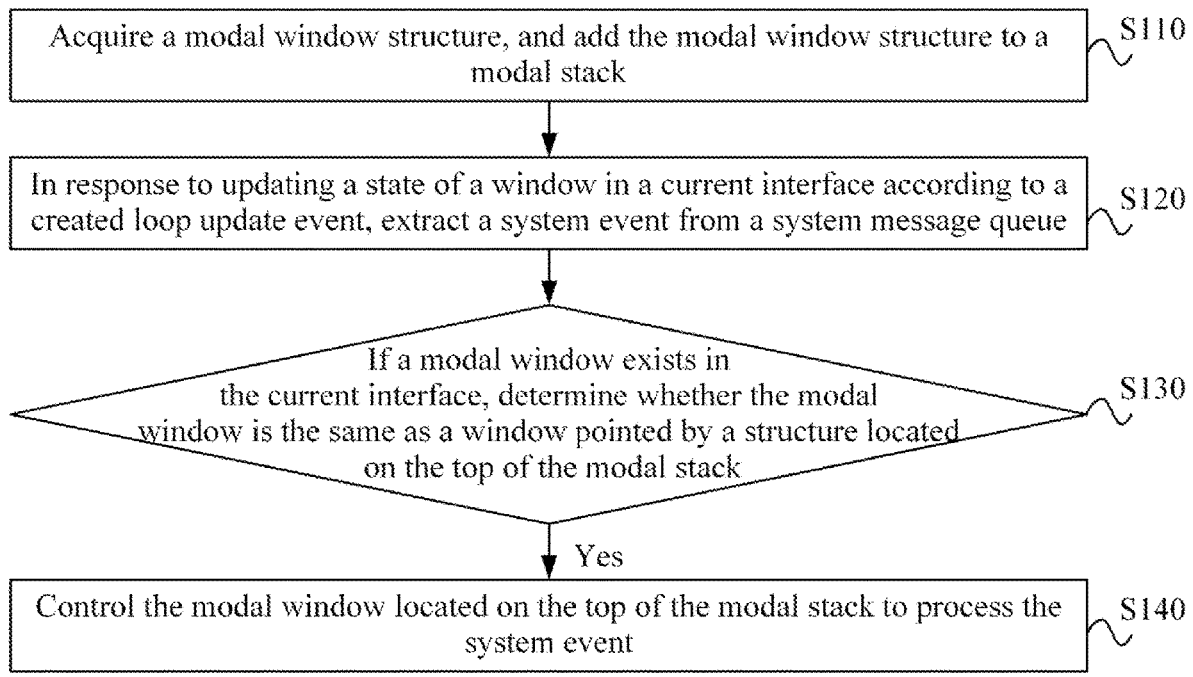
FIG. 1 is a flowchart of a modal window control method according to an embodiment of the present disclosure.

Embodiments of the present disclosure are described in more detail hereinafter with reference to the drawings. Although some embodiments of the present disclosure are shown in the drawings, it is to be understood that the present disclosure may be implemented in various forms and should not be construed as limited to the embodiments set forth herein. Rather, these embodiments are provided so that the present disclosure will be thoroughly and completely understood. It is to be understood that drawings and embodiments of the present disclosure are merely illustrative and are not intended to limit the scope of the present disclosure.

It is to be understood that various steps recited in the method embodiments of the present disclosure may be performed in a different order and/or in parallel. In addition, the method embodiments may include additional steps and/or omit the execution of illustrated steps. The scope of the present disclosure is not limited in this respect.

As used herein, the term "include" and variations thereof are intended to be inclusive, that is, "including, but not limited to". The term "according to" is "at least partially according to". The term "one embodiment" means "at least one embodiment"; the term "another embodiment" means "at least one another embodiment"; and the term "some embodiments" means "at least some embodiments". Related definitions of other terms are given in the description hereinafter.

It is to be noted that references to "first", "second" and the like in the present disclosure are merely intended to distinguish one apparatus, module or unit from another and are not intended to limit the order or interrelationship of the functions performed by the apparatus, module, or unit.

It is to be noted that references to modifications of "one" or "a plurality" mentioned in the present disclosure are intended to be illustrative and not limiting and that those skilled in the art should understand that "one" or "a plurality" should be understood as "one or more" unless clearly expressed in the context.

The names of messages or information exchanged between multiple apparatuses in the embodiments of the present disclosure are for illustrative purposes and are not intended to limit the scope of such messages or information.

FIG. 1 is a flowchart of a modal window control method according to an embodiment of the present disclosure. This embodiment is applicable to the case of controlling a modal window. The method may be executed by a modal window control apparatus. The apparatus may be composed of hardware and/or software and generally integrated into a device having a function of controlling a modal window. The device may be a server, a mobile terminal, a server cluster or other electronic devices. As shown in FIG. 1, the method includes steps 110, 120, 130, and 140 described below.

In step 110, a modal window structure is acquired, and the modal window structure is added to a modal stack.

The modal stack is used for buffering the modal window structure. The modal window (also referred to as a modal dialogue box herein) can be understood as follows: when a modal window is opened, a user can only interact with the modal window, and the events triggered outside the modal window cannot be processed, that is, the modal window monopolizes the event triggered at an interface. The modal window structure may include a window pointer and a window control object. The window pointer is used for pointing to a current window to perform operations on the current window, and the window control session (also referred to as a session herein) is used by an operating system to fulfill the functions of the modal window. The modal stack is used for storing the modal window structure and has a characteristic of first in, last out.

In this embodiment, the process in which the modal window structure is acquired may be as follows: in response to detecting an operation of opening the modal window by a user, a window control session of the modal window is acquired in a non-blocking manner, and the modal window structure is created according to a window pointer of the modal window and the window control object.

The non-blocking manner may be understood as a manner to perform non-blocking on the loop update event, that is, the loop update event at the interface is not blocked. The window pointer is used for pointing to a current window to perform operations on the current window, and the window control object (also referred to as a session herein) is used by the operating system to fulfill the functions of the modal window.

In this embodiment, the process in which the modal window structure is acquired in the non-blocking manner may be understood as follows: the window control session is acquired by calling a native interface beginModalSessionForWindow of the operating system (such as the macOS system, the Android system, and the like), the modal window structure is created according to the window control session and the window pointer, and the modal window structure is added to the modal stack, thereby achieving the open of the modal window.

In this embodiment, the modal window is not opened by calling NSApplication.runModal(for:) or NSWindow.beginSheet(_:completionHandler) so that when the modal window is opened, the loop update event at the interface is not blocked, thereby guaranteeing the update of the state of each window in the interface.

In step 120, in response to updating a state of a window at a current interface according to a created loop update event, a system event is extracted from a system message queue.

The window includes a modal window and/or a modeless window. The loop update event may be implemented according to a frame loop system of a framework (for example, NodeJs) event loop.

Specifically, the process in which the state of the window at the current interface is updated according to the created loop update event may be as follows: an update frequency of the loop update event is set, and the state of the window at the current interface is updated according to the update frequency.

Assuming that the update frequency is x frames/s, each window at the current interface is updated every dt=1000/x ms. In this embodiment, the loop update event performs update on the states of all windows at the current interface to achieve the redrawing and data update of the window.

The system event may be all events that are detected in a current frame and that are triggered by the user at the interface, and the system event may be triggered in a modal window or may be triggered in a modeless window. For example, the system event may be a click event triggered by a mouse or an input event triggered by a keyboard. After the system detects the system event, the system stores the system event in the system message queue, and the system reads the system event from the system message queue to determine whether to process the system event.

Optionally, after the system event is extracted from the system message queue, the method further includes the following steps: the system event is distributed to each window in the current interface, and whether a modal window exists at the current interface is determined according to a window pointer of the each window.

The process in which whether the modal window exists at the current interface is determined according to the window pointer of the each window may be as follows: whether the window pointer points to a modal window is determined, and if the window pointer points to a modal window, it indicates that a modal window exists at the current interface.

Specifically, after the system event is read from the system message queue, the system event is distributed to a function module corresponding to each window opened at the current interface, and whether a window whose window pointer points to the modal window exists at the current interface is determined. If the window whose window pointer points to the modal window exists at the current interface, the modal window located on the top of the modal stack is controlled to process the system events triggered in the modal window, and the other windows omit these system events. If no modal window exists at the current interface, each window is controlled to respond to the system event triggered in the respective window to guarantee the monopoly of the modal window on the system event.

In step 130, if a modal window exists at the current interface, whether the modal window is the same as a window pointed by a structure located on the top of the modal stack is determined.

In this embodiment, whether the modal window is the same as the window pointed by the structure located on the top of the modal stack is determined according to the window pointer. Specifically, the process in which whether the modal window is the same as the window pointed by the structure located on the top of the modal stack is determined includes: a window pointer in the structure located on the top of the modal stack is acquired, and whether the modal window is the same as a window pointed by the window pointer is determined.

Assuming that multiple modal windows exist in the current window, the window pointer in the structure located on the top of the modal stack is compared with the multiple modal windows, respectively, to obtain the modal window which is the same as the window pointed by the structure located on the top of the modal stack. In this embodiment, whether the modal window is the same as the window pointed by the structure located on the top of the modal stack is determined through the window pointer, thereby improving the efficiency of determining the modal window on the top of the modal stack.

In step 140, the modal window located on the top of the modal stack is controlled to process the system event.

The process of processing the system event may be understood as the process of performing the operation corresponding to the system event.

Specifically, the modal window located on the top of the modal stack may be controlled to process the system event in the following manner: whether a trigger location of the system event is in the modal window is determined; and if the trigger location of the system event is in the modal window, the modal window located on the top of the modal stack is controlled to respond to the system event to perform an operation corresponding to the system event.

Specifically, whether the trigger location of the system event is in the modal window may be determined in the following manner: the trigger location of the system event and an area enclosed by the modal window at the current interface are acquired; if the trigger location of the system event is in the area enclosed by the modal window, the system event is in the modal window; and if the trigger location of the system event is not in the area enclosed by the modal window, the system event falls outside the modal window. In this embodiment, only the system event that falls in the modal window located on the top of the modal stack is responded to, thereby improving the reliability of the event response.

Optionally, the method further includes the following steps: in response to detecting an operation of closing the modal window by the user, the modal window structure is deleted from the modal stack, and the modal window is closed at the current interface.

Specifically, when the modal window structure is deleted from the modal stack, the modal window is closed at the current interface.

Figure 2:
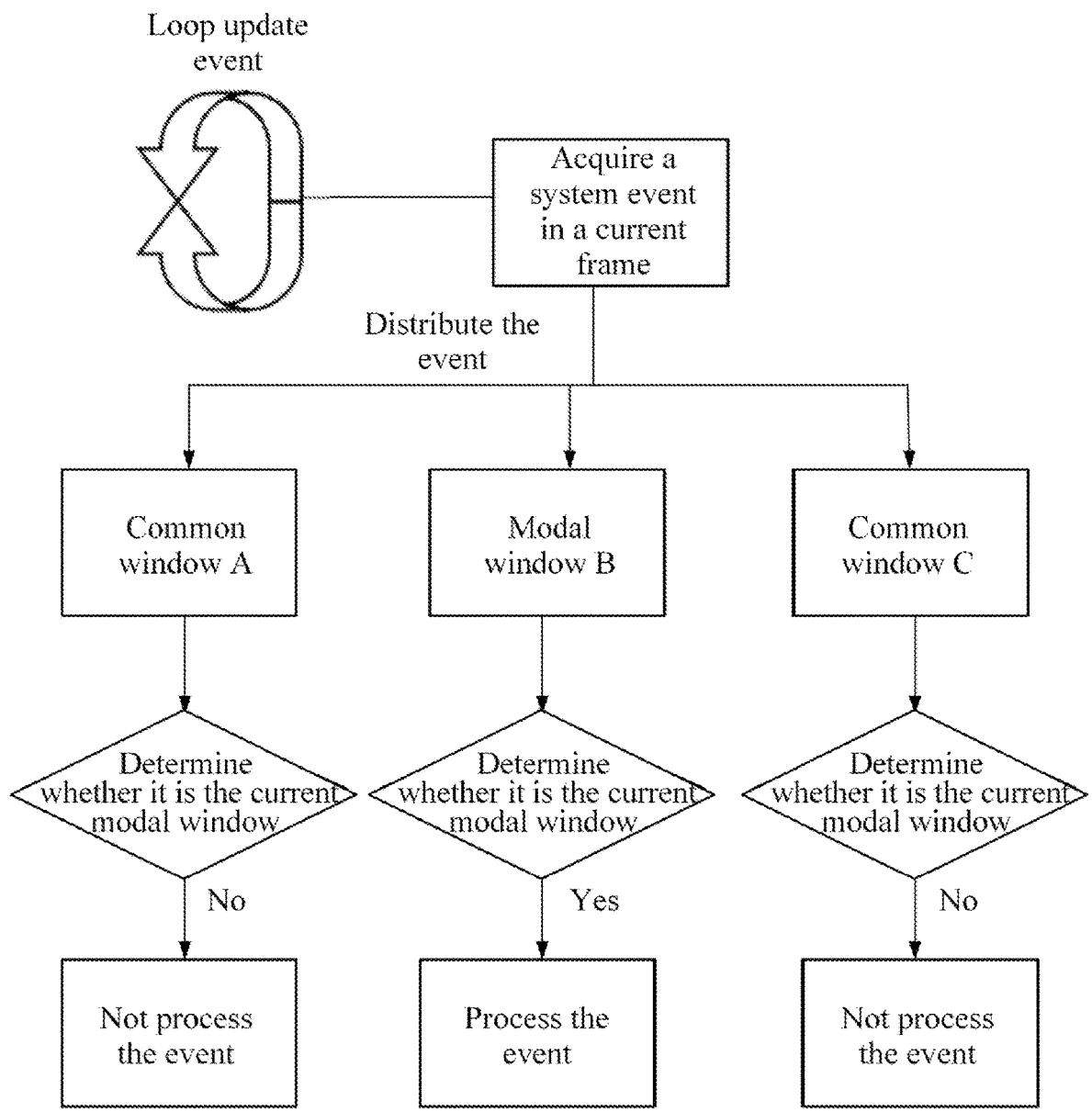
FIG. 2 is an example diagram of a modal window control method according to an embodiment of the present disclosure.

For example, FIG. 2 is an example diagram of a modal window control method according to this embodiment. As shown in FIG. 2, the windows opened at the current interface include a common window A, a modal window B, and a common window C. Since the modal window B is called in a non-blocking manner, the loop update event is not blocked. When the states of the windows at the current interface are updated, a system event is acquired, and the system event is distributed to the common window A, the modal window B, and the common window C. The common window A and the common window C are different from the window pointed by the structure on the top of the modal stack, and the common window A and the common window C do not process the system event. The modal window B is the same as the window pointed by the structure on the top of the modal stack, and the modal window B processes the system event.

In the technical solutions of the present disclosure, a modal window structure is acquired, and the modal window structure is added to a modal stack; in response to updating a state of a window at a current interface according to a created loop update event, a system event is extracted from a system message queue, where the window includes a modal window and/or a modeless window; if the modal window exists at the current interface, whether the modal window is the same as a window pointed by a structure located on the top of the modal stack is determined; and if the modal window is the same as the window pointed by the structure located on the top of the modal stack, the modal window located on the top of the modal stack is controlled to process the system event. The modal window control method provided in the embodiments of the present disclosure can guarantee the execution of frame loop update when a modal window is opened, thereby achieving the object of performing redrawing, data update and other behaviors on other windows in the presence of the modal window.

Figure 3:
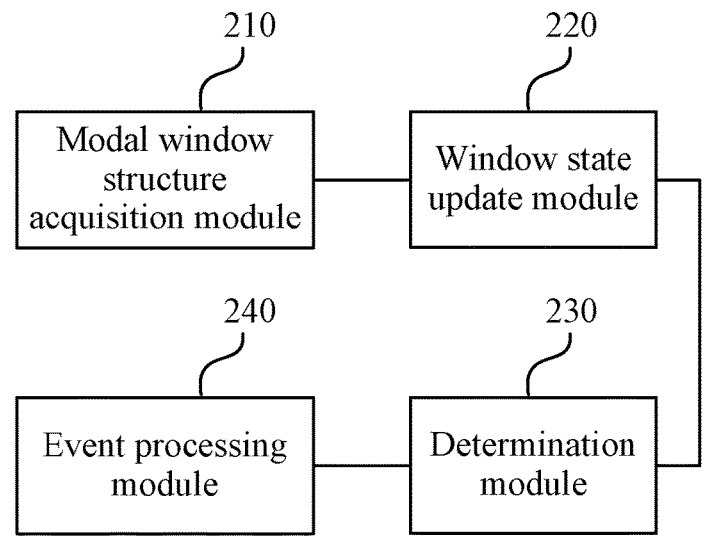
FIG. 3 is a structure diagram of a modal window control apparatus according to an embodiment of the present disclosure.

FIG. 3 is a structure diagram of a modal window control apparatus according to an embodiment of the present disclosure. As shown in FIG. 3, the apparatus includes a modal window structure acquisition module 210, a window state update module 220, a determination module 230, and an event processing module 240 described below.

The modal window structure acquisition module 210 is configured to acquire a modal window structure, and add the modal window structure to a modal stack.

The window state update module 220 is configured to, in response to updating a state of a window at a current interface according to a created loop update event, extract a system event from a system message queue, where the window includes a modal window and/or a modeless window.

The determination module 230 is configured to, if a modal window exists at the current interface, determine whether the modal window is the same as a window pointed by a structure located on the top of the modal stack.

The event processing module 240 is configured to, if the modal window is the same as the window pointed by the structure located on the top of the modal stack, control the modal window located on the top of the modal stack to process the system event.

Optionally, the modal window structure may include a window pointer and a window control object, and the modal window structure acquisition module 210 is further configured to: in response to detecting an operation of opening a modal window by a user, acquire a window control object of the modal window in a non-blocking manner, where the non-blocking manner is to perform non-blocking on the loop update event; and create the structure of the modal window according to a window pointer of the modal window and the window control object.

Optionally, the apparatus further includes an event distribution module. The event distribution module is configured to: distribute the system event to each window at the current interface; and determine whether a modal window exists at the current interface according to a window pointer of the each window.

Optionally, the determination module 230 is further configured to: acquire a window pointer in the structure located on the top of the modal stack; and determine whether the modal window is the same as a window pointed by the window pointer.

Optionally, the event processing module 240 is further configured to: determine whether a trigger location of the system event is in the modal window; and if the trigger location of the system event is in the modal window, control the modal window located on the top of the modal stack to respond to the system event to perform an operation corresponding to the system event.

Optionally, the apparatus further includes a modal window closing module. The modal window closing module is configured to: in response to detecting an operation of closing the modal window by the user, delete the structure of the modal window from the modal stack, and close the modal window at the current interface.

Optionally, the window state update module 220 is further configured to: set an update frequency of the loop update event; and update the state of the window at the current interface according to the update frequency.

The preceding apparatus can execute the methods provided in all embodiments of the present disclosure and has functional modules and beneficial effects corresponding to the executed methods. For technical details not described in detail in this embodiment, reference may be made to the methods provided in all embodiments of the present disclosure.

Figure 4:
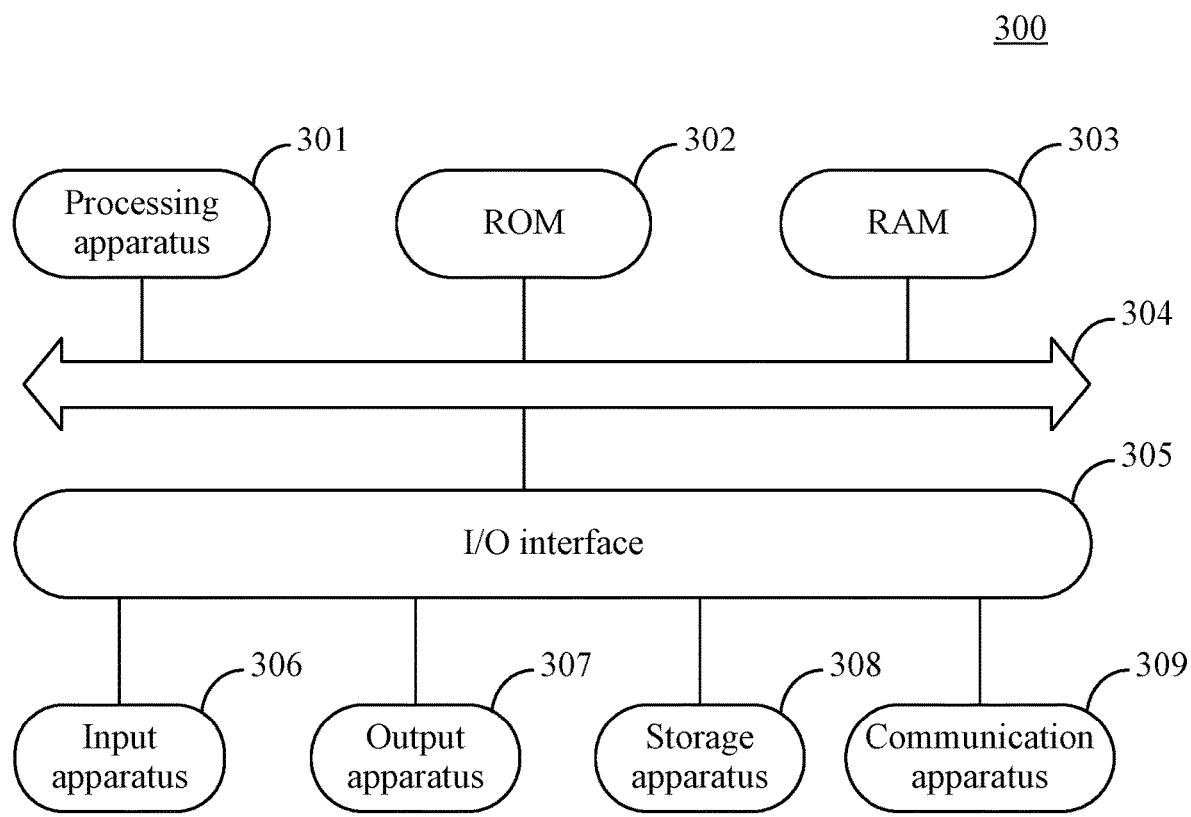
FIG. 4 is a structure diagram of an electronic device according to an embodiment of the present disclosure.

With reference to FIG. 4, FIG. 4 shows a structure diagram of an electronic device 300 suitable for implementing the embodiments of the present disclosure. The electronic device in the embodiments of the present disclosure may include, but is not limited to, a mobile terminal such as a mobile phone, a laptop, a digital broadcast receiver, a personal digital assistant (PDA), a PAD, a portable media player (PMP) and a vehicle-mounted terminal (such as a vehicle-mounted navigation terminal), a fixed terminal such as a digital television (TV) and a desktop computer, and various forms of servers such as a stand-alone server and a server cluster. The electronic device shown in FIG. 4 is illustrative and is not intended to limit the function and usage scope of the embodiments of the present disclosure.

As shown in FIG. 4, the electronic device 300 may include a processing apparatus 301 (such as a central processing unit and a graphics processing unit) and may perform various types of appropriate operations and processing according to a program stored in a read-only memory (ROM) 302 or a program loaded from a storage apparatus 308 to a random-access memory (RAM) 303. Various programs and data required for the operation of the electronic device 300 are also stored in the RAM 303. The processing apparatus 301, the ROM 302, and the RAM 303 are connected to each other via a bus 304. An input/output (I/O) interface 305 is also connected to the bus 304.

Generally, the following apparatuses may be connected to the I/O interface 305: an input apparatus 306 such as a touch screen, a touchpad, a keyboard, a mouse, a camera, a microphone, an accelerometer and a gyroscope; an output apparatus 307 such as a liquid-crystal display (LCD), a speaker and a vibrator; the storage apparatus 308 such as a magnetic tape and a hard disk; and a communication apparatus 309. The communication apparatus 309 may allow the electronic device 300 to perform wireless or wired communication with other devices to exchange data. Although FIG. 4 shows the electronic device 300 having various apparatuses, it is to be understood that not all of the apparatuses shown herein need to be implemented or present. More or fewer apparatuses may alternatively be implemented or present.

Particularly, according to the embodiments of the present disclosure, the processes described above with reference to the flowcharts may be implemented as computer software programs. For example, an embodiment of the present disclosure includes a computer program product. The computer program product includes a computer program carried in a computer-readable medium. The computer program includes program codes for performing a modal window control method. In such an embodiment, the computer program may be downloaded from a network and installed through the communication apparatus 309, may be installed from the storage apparatus 308, or may be installed from the ROM 302. When the computer program is executed by the processing apparatus 301, the preceding functions defined in the method provided in the embodiments of the present disclosure are executed.

It is to be noted that the preceding computer-readable medium in the present disclosure may be a computer-readable signal medium, a computer-readable storage medium or any combination thereof. The computer-readable storage medium, for example, may be, but is not limited to, an electronic, magnetic, optical, electromagnetic, infrared or semiconductor system, apparatus or device or any combination thereof. More specific examples of the computer-readable storage medium may include, but are not limited to, an electrical connection with one or more wires, a portable computer magnetic disk, a hard disk, a random-access memory (RAM), a read-only memory (ROM), an erasable programmable read-only memory (EPROM, or a flash memory), an optical fiber, a portable compact disk read-only memory (CD-ROM), an optical memory device, a magnetic memory device, or any appropriate combination thereof. In the present disclosure, the computer-readable storage medium may be any tangible medium that contains or stores a program for use by or in connection with an instruction execution system, apparatus, or device. In the present disclosure, the computer-readable signal medium may include a propagated data signal with computer-readable program code embodied therein, for example, in baseband or as part of a carrier wave. Such a propagated data signal may take any of a variety of forms, including, but not limited to, electro-magnetic, optical, or any suitable combination thereof. The computer-readable signal medium may further be any computer-readable medium that is not a computer-readable storage medium and that can communicate, propagate, or transport a program for use by or in connection with an instruction execution system, apparatus, or device. The program codes included on the computer-readable medium may be transmitted via any appropriate medium which includes, but is not limited to, a wire, an optical cable, a radio frequency (RF), or any appropriate combination thereof.

In some embodiments, clients and servers may communicate using any currently known or future-developed network protocol, such as HyperText Transfer Protocol (HTTP), and may be interconnected with any form or medium of digital data communication (such as a communication network). Examples of the communication network include a local area network (LAN), a wide area network (WAN), an internet (such as the Internet), and a peer-to-peer network (such as an ad hoc network), as well as any currently known or future-developed network.

The computer-readable medium may be included in the preceding electronic device or may exist alone without being assembled into the electronic device.

The preceding computer-readable medium carries one or more programs that, when executed by the electronic device, cause the electronic device to: acquire a modal window structure, and add the modal window structure to a modal stack; in response to updating a state of a window at a current interface according to a created loop update event, extract a system event from a system message queue, where the window includes a modal window and/or a modeless window; if a modal window exists at the current interface, determine whether the modal window is the same as a window pointed by a structure located on the top of the modal stack; and if the modal window is the same as the window pointed by the structure located on the top of the modal stack, control the modal window located on the top of the modal stack to process the system event.

Computer program codes for performing the operations in the present disclosure may be written in one or more programming languages or combinations thereof. The preceding one or more programming languages include, but are not limited to, object-oriented programming languages such as Java, Smalltalk and C++, and conventional procedural programming languages such as C or similar programming languages. Program codes may be executed entirely on a user computer, partly on a user computer, as a stand-alone software package, partly on a user computer and partly on a remote computer, or entirely on a remote computer or a server. In the case where the remote computer is involved, the remote computer may be connected to the user computer via any kind of network including a local area network (LAN) or a wide area network (WAN) or may be connected to an external computer (for example, through the Internet using an Internet service provider).

The flowcharts and block diagrams in the drawings illustrate system architectures, functions, and operations possibly implemented by the system, method, and computer program product of various embodiments of the present disclosure. In this regard, each block in the flowcharts or block diagrams may represent a module, a program segment, or part of codes, where the module, program segment, or part of codes may contain one or more executable instructions for implementing a prescribed logic function. It is also to be noted that in some alternative implementations, the functions noted in the blocks may occur out of the order noted in the drawings. For example, two successively expressed blocks may actually be executed substantially in parallel, or the blocks may sometimes be executed in a reverse order, depending on the functionality involved. It is also to be noted that each block in the block diagrams and/or flowcharts and a combination of blocks in the block diagrams and/or flowcharts may be implemented by special-purpose hardware-based systems that perform the specified functions or operations, or combinations of special-purpose hardware and computer instructions.

The units involved in the embodiments of the present disclosure may be implemented in a software manner or in a hardware manner. The name of a unit is not intended to limit the unit in a certain circumstance.

The functions described above herein may be executed, at least in part, by one or more hardware logic components. For example, and without limitations, example types of hardware logic components that may be used include: a field-programmable gate array (FPGA), an application-specific integrated circuit (ASIC), an application-specific standard product (ASSP), system on a chip (SOC), a complex programmable logic device (CPLD) and the like.

In the context of the present disclosure, the machine-readable medium may be a tangible medium that may include or store a program for use by or in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination thereof. More specific examples of the machine-readable storage medium may include an electrical connection according to one or more wires, a portable computer disk, a hard disk, a random-access memory (RAM), a read-only memory (ROM), an erasable programmable read-only memory (EPROM, or a flash memory), an optical fiber, a portable compact disk read-only memory (CD-ROM), an optical memory device, a magnetic memory device, or any appropriate combination thereof.

According to one or more embodiments of the present disclosure, a modal window control method is provided and includes the following steps.

A modal window structure is acquired, and the modal window structure is added to a modal stack.

In response to updating a state of a window at a current interface according to a created loop update event, a system event is extracted from a system message queue, where the window includes a modal window and/or a modeless window.

If a modal window exists at the current interface, whether the modal window is the same as a window pointed by a structure located on the top of the modal stack is determined.

If the modal window is the same as the window pointed by the structure located on the top of the modal stack, the modal window located on the top of the modal stack is controlled to process the system event.

Further, the modal window structure includes a window pointer and a window control object, and the step in which the modal window structure is acquired includes the following steps.

In response to detecting an operation of opening a modal window by a user, a window control object of the modal window is acquired in a non-blocking manner, where the non-blocking manner is to perform non-blocking on the loop update event.

The modal window structure is created according to a window pointer of the modal window and the window control object.

Further, after the system event is extracted from the system message queue, the method further includes the following steps.

The system event is distributed to each window at the current interface.

Whether a modal window exists at the current interface is determined according to a window pointer of the each window.

Further, the step in which whether the modal window is the same as the window pointed by the structure located on the top of the modal stack is determined includes the following steps.

A window pointer in the structure located on the top of the modal stack is acquired.

Whether the modal window is the same as a window pointed by the window pointer is determined.

Further, the step in which the modal window located on the top of the modal stack is controlled to process the system event includes the following steps.

Whether a trigger location of the system event is in the modal window is determined.

If the trigger location of the system event is in the modal window, the modal window located on the top of the modal stack is controlled to respond to the system event to perform an operation corresponding to the system event.

Further, the method further includes the following step.

In response to detecting an operation of closing the modal window by the user, the modal window structure is deleted from the modal stack, and the modal window is closed at the current interface.

Further, the process in which the state of the window at the current interface is updated according to the created loop update event includes the following steps.

An update frequency of the loop update event is set.

The state of the window at the current interface is updated according to the update frequency.

It is to be noted that the above are merely preferred embodiments of the present disclosure and the technical principles used therein. It is to be understood by those skilled in the art that the present disclosure is not limited to the embodiments described herein. Those skilled in the art can make various apparent modifications, adaptations and substitutions without departing from the scope of the present disclosure. Therefore, while the present disclosure has been described in detail through the above embodiments, the present disclosure is not limited to the above embodiments and may include more other equivalent embodiments without departing from the concept of the present disclosure. The scope of the present disclosure is determined by the scope of the appended claims.

What is claimed is:

1. A modal window control method, comprising:
   acquiring a modal window structure, and adding the modal window structure to a modal stack, wherein the modal stack is used for buffering the modal window structure;
   in response to updating a state of each window of at least one window existing at a current interface according to a created loop update event, extracting a system event from a system message queue;
   in response to a modal window existing at the current interface, determining whether the modal window is the same as a window pointed by a structure located on a top of the modal stack; and
   in response to the modal window being the same as the window pointed by the structure located on the top of the modal stack, controlling the window located on the top of the modal stack to process the system event;
   wherein acquiring the modal window structure comprises:
   in response to detecting an operation of opening the modal window by a user, acquiring a window control object of the modal window in a non-blocking manner; wherein the non-blocking manner is to perform non-blocking on the loop update event; and creating the modal window structure according to a window pointer of the modal window and the window control object;
   wherein the modal window structure comprises the window pointer and a window control session.

2. The method according to claim 1, after the extracting a system event from a system message queue, further comprising:
   distributing the system event to each window of the at least one window at the current interface; and
   determining whether the modal window exists at the current interface according to a window pointer of each window.

3. The method according to claim 1, wherein the determining whether the modal window is the same as a window pointed by a structure located on a top of the modal stack comprises:
   acquiring a window pointer in the structure located on the top of the modal stack; and
   determining whether the modal window is the same as a window pointed by the window pointer.

4. The method according to claim 1, wherein the controlling the window located on the top of the modal stack to process the system event comprises:
   determining whether a trigger location of the system event is in the modal window; and
   in response to the trigger location of the system event is in the modal window, controlling the window located on the top of the modal stack to respond to the system event to perform an operation corresponding to the system event.

5. The method according to claim 1, further comprising:
   in response to detecting an operation of closing the modal window by the user, deleting the modal window structure from the modal stack, and closing the modal window at the current interface.

6. The method according to claim 1, wherein the updating a state of a window at a current interface according to a created loop update event comprises:
   setting an update frequency of the loop update event; and
   updating the state of the window at the current interface according to the update frequency.

7. The method according to claim 1, wherein a modeless window further existing at the current interface.

8. An electronic device, comprising:
   one or more processing apparatuses; and
   a storage apparatus, which is configured to store one or more programs;
   wherein the one or more programs, when executed by the one or more processing apparatuses, enable the one or more processing apparatuses to perform:

acquiring a modal window structure, and adding the modal window structure to a modal stack, wherein the modal stack is used for buffering the modal window structure;

in response to updating a state of each window of at least one window existing at a current interface according to a created loop update event, extracting a system event from a system message queue;

in response to a modal window existing at the current interface, determining whether the modal window is the same as a window pointed by a structure located on a top of the modal stack; and in response to the modal window being the same as the window pointed by the structure located on the top of the modal stack, controlling the window located on the top of the modal stack to process the system event;

wherein the one or more processing apparatuses acquires the modal window structure by: in response to detecting an operation of opening the modal window by a user, acquiring a window control object of the modal window in a non-blocking manner; wherein the non-blocking manner is to perform non-blocking on the loop update event; and creating the modal window structure according to a window pointer of the modal window and the window control object; wherein the modal window structure comprises the window pointer and a window control session.

9. The electronic device according to claim 8, after extracting a system event from a system message queue, the one or more processing apparatuses is further configured to perform:

distributing the system event to each window of the at least one window at the current interface; and determining whether the modal window exists at the current interface according to a window pointer of each window.

10. The electronic device according to claim 8, wherein the one or more processing apparatuses determines whether the modal window is the same as a window pointed by a structure located on a top of the modal stack by:

acquiring a window pointer in the structure located on the top of the modal stack; and determining whether the modal window is the same as a window pointed by the window pointer.

11. The electronic device according to claim 8, wherein the one or more processing apparatuses controls the window located on the top of the modal stack to process the system event by:

determining whether a trigger location of the system event is in the modal window; and in response to the trigger location of the system event is in the modal window, controlling the window located on the top of the modal stack to respond to the system event to perform an operation corresponding to the system event.

12. The electronic device according to claim 8, wherein the one or more processing apparatuses is further configured to perform:

in response to detecting an operation of closing the modal window by the user, deleting the modal window structure from the modal stack, and closing the modal window at the current interface.

13. The electronic device according to claim 8, wherein the one or more processing apparatuses updates a state of a window at a current interface according to a created loop update event by:

setting an update frequency of the loop update event; and updating the state of the window at the current interface according to the update frequency.

14. The electronic device according to claim 8, wherein comprising a modeless window further existing at the current interface.

15. A non-transitory computer-readable medium storing a computer program, wherein the program, when executed by a processing apparatus, performs:

acquiring a modal window structure, and adding the modal window structure to a modal stack, wherein the modal stack is used for buffering the modal window structure;

in response to updating a state of each window of at least one window existing at a current interface according to a created loop update event, extracting a system event from a system message queue;

in response to a modal window existing at the current interface, determining whether the modal window is the same as a window pointed by a structure located on a top of the modal stack; and in response to the modal window being the same as the window pointed by the structure located on the top of the modal stack, controlling the window located on the top of the modal stack to process the system event;

wherein the program acquiring a modal window structure comprises: in response to detecting an operation of opening the modal window by a user, acquiring a window control object of the modal window in a non-blocking manner; wherein the non-blocking manner is to perform non-blocking on the loop update event; and creating the modal window structure according to a window pointer of the modal window and the window control object; wherein the modal window structure comprises the window pointer and a window control session.

16. The non-transitory computer-readable medium according to claim 15, after extracting a system event from a system message queue, the program is further configured to perform:

distributing the system event to each window of the at least one window at the current interface; and determining whether the modal window exists at the current interface according to a window pointer of each window.

17. The non-transitory computer-readable medium according to claim 15, wherein the program determines whether the modal window is the same as a window pointed by a structure located on a lop of the modal stack by:

acquiring a window pointer in the structure located on the top of the modal stack; and determining whether the modal window is the same as a window pointed by the window pointer.

\* \* \* \* \*